April 29, 1952     I. E. COFFEY     2,595,127
METHOD OF FORMING DIAPHRAGMS
Filed Dec. 9, 1946     5 Sheets-Sheet 1

*INVENTOR.*
IRVEN E. COFFEY
BY
*George R. Ericson*
ATTORNEY

April 29, 1952  I. E. COFFEY  2,595,127
METHOD OF FORMING DIAPHRAGMS
Filed Dec. 9, 1946  5 Sheets-Sheet 2
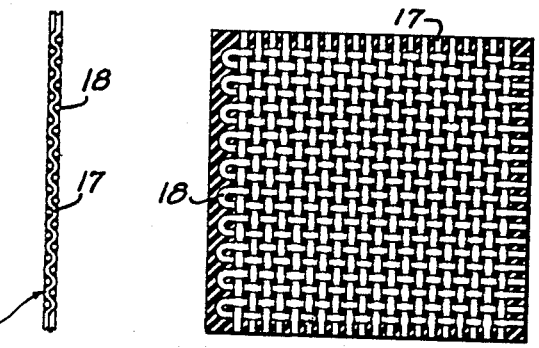
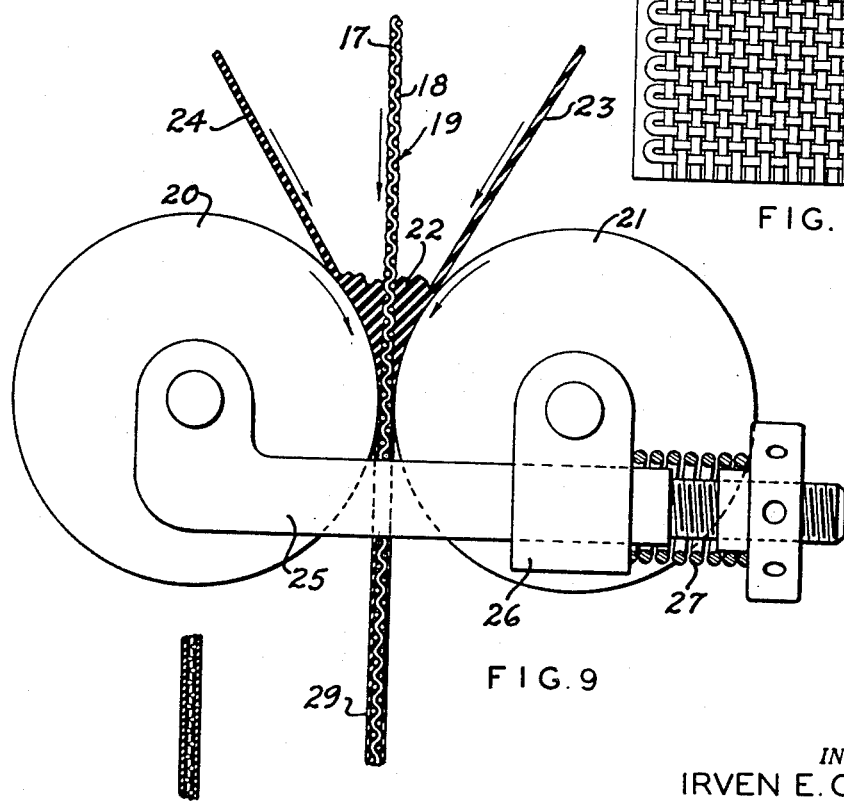
INVENTOR.
IRVEN E. COFFEY
BY
ATTORNEY April 29, 1952    I. E. COFFEY    2,595,127
METHOD OF FORMING DIAPHRAGMS
Filed Dec. 9, 1946    5 Sheets-Sheet 3

INVENTOR
IRVEN E. COFFEY
BY George R. Ericson
ATTORNEY

April 29, 1952     I. E. COFFEY     2,595,127
METHOD OF FORMING DIAPHRAGMS
Filed Dec. 9, 1946

INVENTOR
IRVEN E. COFFEY
BY
ATTORNEY

April 29, 1952  I. E. COFFEY  2,595,127
METHOD OF FORMING DIAPHRAGMS
Filed Dec. 9, 1946  5 Sheets-Sheet 5

INVENTOR
IRVEN E. COFFEY
BY
*George R. Ericson*
ATTORNEY

Patented Apr. 29, 1952

2,595,127

UNITED STATES PATENT OFFICE 2,595,127

METHOD OF FORMING DIAPHRAGMS

Irven E. Coffey, St. Louis, Mo., assignor to Carter Carburetor Corporation, St. Louis, Mo., a corporation of Delaware Application December 9, 1946, Serial No. 715,040

13 Claims. (Cl. 154—124)

This invention relates to diaphragms and particularly to diaphragms for fuel pumps and the like. An important use of the diaphragm is in connection with fuel pumps for pumping the gasoline in internal combustion engines such, for instance, as the pump disclosed in my copending application, Serial No. 536,162, filed May 18, 1944, now Patent No. 2,426,965, issued September 2, 1947.

In fuel pumps of this type the pump and diaphragm are subjected to severe strains under wide variations of temperature and exposed to liquids and gases, including gasoline, benzine, alcohol, water, and others, which are likely to attack and weaken or destroy the coating material on the diaphragm. I make this diaphragm on a cloth base and coat or impregnate it with a material, such as synthetic rubber, which is resistant to the action of the gasoline or other liquid which is to be pumped. One of the conditions required of the diaphragm is that it must remain flexible enough to permit distortion into a substantially frusto-conical and split doughnut shape by the diaphragm operating means while the edges of the diaphragm are rigidly held. The service required of diaphragms in fuel pumps for automotive engines is severe, as they have to operate at high speed under considerable and sharply varying tension for thousands of hours during the life of the car. For this reason, considerable diaphragm trouble has been experienced by fuel pump manufacturers in spite of such expedients as multiple thickness and multiple layer diaphragms. Up to the time of this invention, it has been impossible or impractical to obtain a satisfactory diaphragm, particularly of the single layer, rubber coated type which is most desirable for fuel pump use.

I have found that Buna-N rubber has good qualities of resistance to the action of the liquids named and is not too seriously affected by the ranges of temperature in which an internal combustion engine fuel pump must operate, namely, 50° below zero to 300° Fahrenheit. On the other hand, this material has comparatively little tensile strength, not nearly sufficient to permit its use in forming a diaphragm without re-enforcement, and there has been no satisfactory solution of the problem of applying, connecting, and correlating a satisfactory re-enforcing material to the Buna-N rubber. For instance, if the yarn or cords of the cloth used as the re-enforcing material are impregnated with the rubber, the finished diaphragm becomes stiff and frangible. On the other hand, if the rubber is not bonded to the fabric, it is likely to strip off or form blisters which rapidly increase in size and result in eventual failure of the diaphragm. It will be understood, of course, that no real bonding of the rubber to the fabric is possible without impregnation of the yarn and bonding together of the individual fibres thereof, and where the yarn or cords are thus impregnated, proper slippage between the fibres is prevented, so that the finished diaphragm soon breaks down under severe use.

On account of the above described dilemma, it has previously been considered impractical to use synthetic rubber diaphragms for fuel pumps, but I have found that a satisfactory diaphragm of this type can be made in accordance with the invention described herein, and that such diaphragms meet all the necessary requirements for automotive fuel pump services.

First, I select a base fabric having a weave in the order of twenty threads per inch and the weight of 12 ounces per square yard. The cords of the fabric may be formed of four yarns twisted together, and the twisting and weave are such that the resulting fabric, if made of cotton, has a micrometer thickness of approximately $\frac{1}{32}''$, under pressure of approximately 25 pounds per square inch. One such fabric available for the purpose is commercially known as chaffered duck. This material upon inspection has no appreciable interstices in the weave and has not been considered in any way suitable for use in making rubber coated diaphragms.

In accordance with this invention, I apply uncured Buna-N rubber to both sides of this material by passing it through calender rolls, using such pressure as to stretch the warp threads of the fabric from 5% to 10%. This refers to the condition of the fabric after it has passed through the rolls and not to the amount to which it is actually stretched while passing through the rolls. The weft threads are not substantially stretched in this operation.

For convenience in calendering, it may be desirable to give the material a prime coat on both sides with a thinner mastic of Buna-N or other synthetic rubber dissolved in methyl-ethyl-ketone, and permit this to dry before applying the main coats, but this should not be thin enough to cause impregnation of the cords. The application of this prime coat superficially bonded to both surfaces of the cloth provides an adhesive surface to which the main coat of rubber will adhere in calendering.

After calendering, the cloth is cut longitudinally in strips about 24 to 30 inches long and slightly wider than the finished diaphragm, which in a particular case is approximately four inches, and then cured between flat molds which are brought together slowly at a temperature of about 300° to 315° Fahrenheit, the pressure eventually applied being approximately 750 pounds per square inch. I bring the molds together slowly during the last few thousandths of an inch of travel and the slow building up of the pressure causes the rubber to tend to flow outwardly as in a conduit, and since the distance is shorter to the side of the mold than to the end, there is a stretching action sideways tending to equalize the tension on the warp and weft.

During this process, the rubber is forced into the interstices of the weave from both sides, and since the rubber is highly viscous, it tends to force the fluff or loose projecting fibres back into the cord, so that the interstices are opened up and the cords are reduced to a dimension of approximately $1/100''$ in diameter. This opens up the interstices and permits the rubber flowing from the opposite sides to meet and bond in the center of the cloth, so that each one of the interstices is filled with a roughly square spool-shaped plug which is provided on each end with a poppet-valve-shaped head formed by the surface layer of the cloth. The actual surface layer should not be more than .015'' to .030'' in thickness, while the dimension across the smallest portion of the plugs in the middle of the cloth will be from .025'' to .040''.

For this reason, any failures in the surface layers of the rubber cannot result in failure of the diaphragm, because each of the interstices is filled with a self-closing valve which merely tends to close tight, as a check valve or poppet valve, when the pressure tends to force the liquid through the cloth.

By this means also I provide a diaphragm in which the individual cords are substantially separated and yet not impregnated. Also, the cords preserve a substantial curvature or crimp so as to permit substantial stretching in the use of the diaphragm.

The main object of the present invention is to provide a new and improved diaphragm which will be capable of handling internal combustion engine fuel and lasting the full life of the engine with which it is to be used.

A further object of my invention is to provide a new and improved method of treating fabric and particularly woven fabric for the purpose of adapting it for use in the making of diaphragms.

It is a further object of this invention to provide a new and improved rubber coated cloth diaphragm in which the surface coatings of rubber are joined together by rivets extending through the interstices of the weave and in which the diameter of such rivets is at least as great as the thickness of the surface layer of rubber.

It is a further object of this invention to produce a new and improved rubber coated cloth pump diaphragm material in which the yarn of the cloth has its individual fibers encased in a thin coating of rubber and in which the individual cords of the fabric are precast and separated from each other in a crimped position prior to the application of the surface coating of the rubber.

It is a further object of the invention to produce a rubber coated cloth or fabric diaphragm in which the stretch and crimp of the cords of the warp and weft are equalized before the final curing of the rubber.

It is a further object of the invention to produce a diaphragm of the above described character having equal stretching qualities in the direction of the warp and weft.

It is another object to provide a new method for forming diaphragms in which the strains applied in distorting the diaphragm during use will be evenly resisted by the threads of the fabric base.

It is another object to provide a new method for forming diaphragms of the coated fabric type in large quantities while maintaining high standards of durability and strength.

It is still another object to provide novel means for forming diaphragms of the coated fabric type in which the coating and curing operations stretch the longitudinal and transverse threads by equal amounts so that the threads in the finished diaphragm will be equally spaced and tensioned so as to uniformly carry the strain incident to use of the diaphragm.

These objects and other objects hereafter appearing are attained by the method illustrated in the accompanying drawings in which:

Fig. 5 shows a longitudinal sectional view of the fabric after the application of a preliminary coat of rubber to each side.

Fig. 6 shows a transverse sectional view of the fabric with the preliminary coating.

Fig. 7 is a sectional plan view of the material after the application of the uncured rubber before pressing and curing.

Fig. 8 is a sectional plan view showing the material after the final application and curing of the synthetic rubber, the top layer of rubber being removed for inspection of the fabric and the central portion of the rivets.

Fig. 9 shows the application in a calender of the synthetic rubber to the precoated fabric, the section of the fabric being taken along a warp thread.

Fig. 10 shows a section of the fabric as it comes from the calender, the section being taken between the warp threads.

Fig. 19 shows a magnified section similar to

Figure 18:
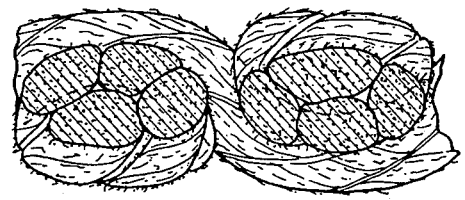
Fig. 18 is a magnified cross section showing the cords of the cloth taken substantially on line 18—18 of Fig. 17.

Figure 18 after the application of the preliminary coating.

Figure 19:
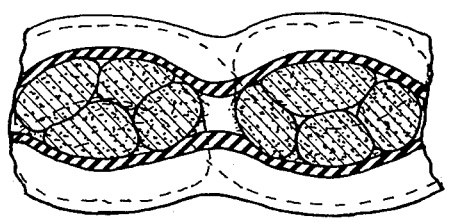
Figure 20:
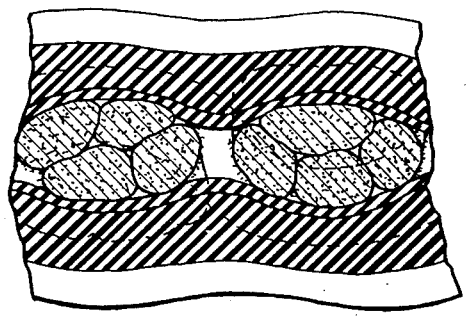

Fig. 20 is a magnified section similar to Figs. 18 and 19 after the application of the main coating but before pressing and curing.

Figure 17:
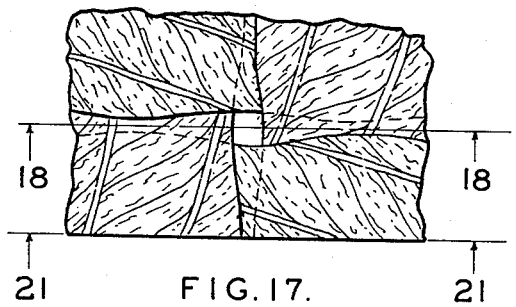
Fig. 17 shows a magnified plan view of a portion of the original cloth before any coating is applied.
Figure 21:
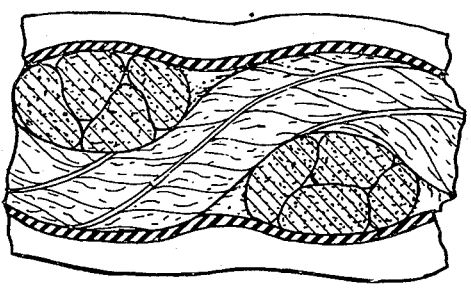

Fig. 21 is a view similar to Fig. 19 except that the cross section is taken substantially on line 21—21 of Fig. 17.

Figure 22:
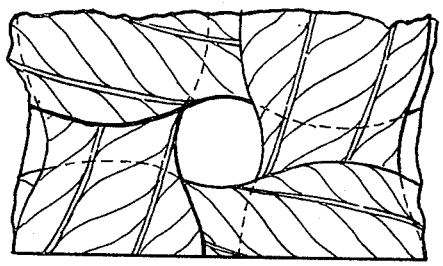

Fig. 22 shows a plan view similar to Figure 17 except that the change of shape and position of the cords due to pressing and curing is shown.

Figure 23:
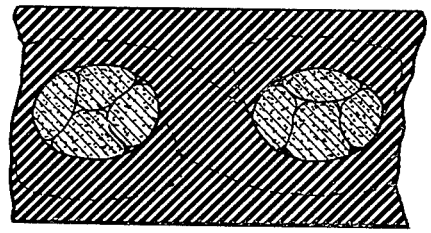

Fig. 23 is a cross sectional view similar to Figures 18, 19 and 20 except that it is taken after pressing and curing and shows the changed condition of the cords.

Figure 24:
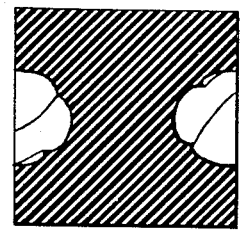

Fig. 24 is similar to Figure 23 except that it shows a single rivet or double headed plug comprising sections of the two surface layers joined by the hour glass shaped portion extending through the opening which is formed in the weave during the process, the cords being removed.

Figure 25:
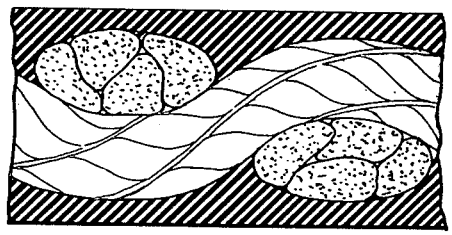

Fig. 25 is similar to Figure 23 except that the section is taken along the line of the cord instead of between the cord.

The reference numeral 1 indicates the main body member of the fuel pump having a flange 2 by means of which it is adapted to be mounted on an internal combustion engine, or machine, to which it is to be attached. Operating lever 3 normally yieldingly held in the position shown by the spring 4 is connected to the diaphragm shaft 5 by a one way connection which has no bearing on the present invention and is not shown herein. The full structural details of the pump are shown in my above mentioned co-pending application. The flexible diaphragm 6 is mounted between flanges 7 and 8 and may be provided with perforations 9 to receive the flange bolts or rivets. The pump is provided with an inlet 10 and an outlet 11, together with suitable valves for controlling the inlet and outlet. The central part of the diaphragm 6 is rigidly clamped between the washers 12 and 13, which are especially shaped as shown herein and as claimed in my co-pending application. An operating spring 14, held in place between the washers 12 and 15 serves to maintain a constant discharge pressure for the pump.

Figure 2:
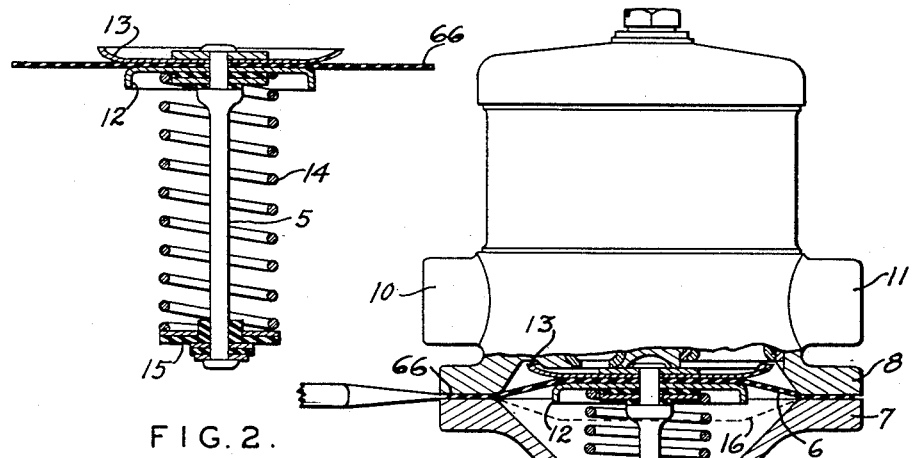
Fig. 2 shows a sectional elevation of a diaphragm assembly separate from the pump.
Figure 1:
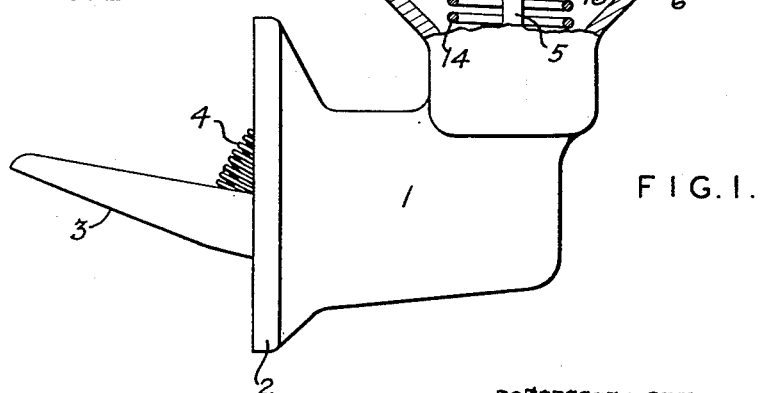
Fig. 1 shows a diaphragm, according to my invention, mounted in a fuel pump of the type shown in said copending application, Serial No. 536,162, filed May 18, 1944.

During the maximum intake stroke of the pump, the diaphragm is shifted from the position shown in Fig. 1, first, to the flat position corresponding to Fig. 2 and, finally, to a position corresponding to the dotted lines 16 shown in Fig. 1. This requires the diaphragm to be not only flexible, but slightly resilient and since the reciprocating action of the diaphragm must be very rapid under certain conditions, heavy strains are imposed due to the inertia of the liquid which must be accelerated and decelerated in the up and down movement of the diaphragm. As stated above, the object of this invention is to provide a means and method for producing a diaphragm having the strength and resilience required to function durably in the above described manner.

Figure 4:
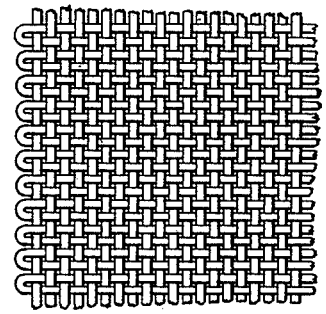
Fig. 4 is a plan view showing the weave of the fabric upon which my diaphragm is based.
Figure 11:
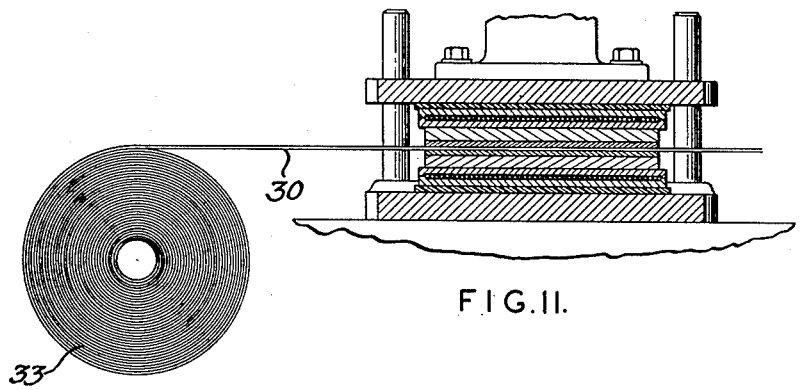
Fig. 11 is a sectional view on a reduced scale of a press used in curing the coated fabric after the coated sheet has been cut into strips.
Figure 12:
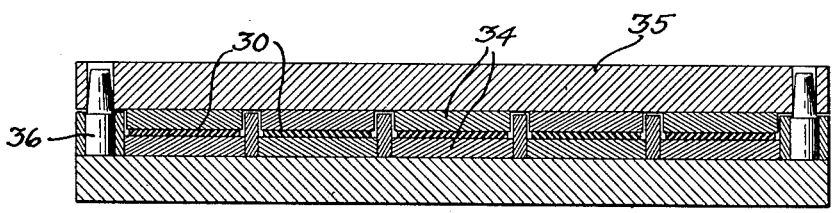
Fig. 12 shows a number of strips of the coated fabric applied to the curing press.
Figure 13:
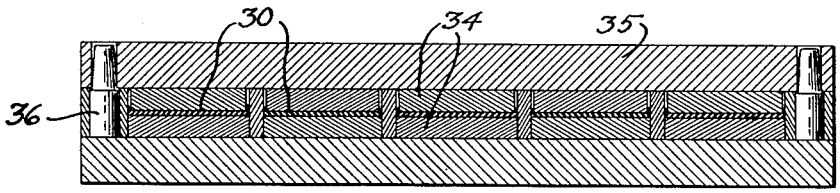
Fig. 13 is a view similar to Fig. 12, but after the pressure and heat have been applied to the coated strips.

I have shown in Fig. 4, considerably magnified, a sheet of duck fabric which serves as the base material for the diaphragm. The warp and weft are suitably made of four-thread yarn spaced from sixteen to twenty-five cords to the inch and equally spaced and tensioned in both directions. Cotton duck has proven to be most satisfactory, but other fibres such as rayon or nylon may be used.

The proper selection and weaving of the fabric is important, and I therefore give the following example of a material which has been found to be suitable for the purpose:

Weight: 12 ounces per square yard.
Thread count of cloth before processing: Warp 20—weft 20.
Yarn: 4 ply.
Thickness: .037 to .041.
Micrometer thickness: .025.
Crimp: Warp 14 to 18%—weft 6 to 10%.

The difference in the crimp is important, as the calendering is preferably done in the direction of the warp, and this operation stretches out the crimp to such an extent as to cause unevenness in the final material and breakage which might even occur during the calendering process, except for the provision of substantial crimp to allow the cloth to stretch during calendering.

Buna-N or other suitable plastic material is first applied as a base coat in relatively thin state by means of a scraper. The cloth is then passed in the direction of the warp between calendering rolls 20 and 21 which are supplied with uncured synthetic rubber in a somewhat thicker condition. As indicated at 22, the rubber builds up a gob in advance of each roll. This gob is continuously supplied by means of the uncured Buna-N rubber strips 23 and 24 which are fed into the gob as required. The base coating forms an adhesive surface which prevents the thick Buna-N mastic material from sticking to the rolls.

Suitable spacing and tension of the rolls is provided by a mounting which is diagrammatically indicated at 25 and 26 with adjustable spring means 27 for controlling the pressure and spacing. The pressure is sufficient to press the uncured rubber into the surfaces of the fabric, but not sufficient to press it through the interstices between the threads, or to form the nodules which push the fuzz back into the yarn and join in the middle, as this must be reserved for the curing, pressing and tension balancing operation. It is important, also, that the threads themselves be not impregnated, as is the case when the fabric is dipped in the rubber material in a liquid or soft state.

During the rolling operation, the resistance of the gob or gobs 22 to passing through the rollers sets up a very substantial tension tending to stretch the warp or longitudinal threads along the direction of rolling and separate the weft.

The uncured rubber is thus rolled into the surfaces of the cloth which is simultaneously stretched approximately 5% or more in the direction of the warp. The two surface layers, however, are not joined in the middle, because the rubber in its comparatively cool condition cannot be forced into the interstices without applying such pressure as to tear the cloth, and the condition of the cloth after calendering is as shown in Figure 20.

Figure 14:
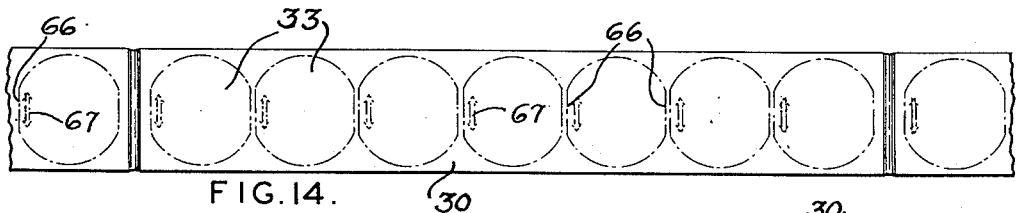
Fig. 14 shows the method of cutting diaphragm disks from the coated and cured strips.

The coating material is cured by the application of heat and stationary pressure, as illustrated in Figs. 11, 12, 13, 15 and 16. The calendered sheet of coated fabric is cut into longitudinal strips 30 slightly wider than the diameter of the diaphragm, as indicated in Fig. 14. These strips are mounted in rolls 33 and fed between the opposed plates 34 of a heating press 35, the plates being of substantial length, that is, at least as long as the diameters of several diaphragms, and preferably 24 to 36 inches long, the width of a particular design being 4 inches. Sufficient heat and pressure are applied to cure the synthetic rubber material and to stretch the weft threads so that in the finished product, both longitudinal and transverse threads are at the same tension and equally spaced. In practice, a pressure of 750 pounds per square inch and temperature of from 307 to 310° Fahrenheit are applied from 10 to 15 minutes. Shouldered press guides 36 provide stops so that the finished product will be reduced in thickness to between 0.55 and .065 inch, with a layer of synthetic rubber .010 to .020 inch thick on both sides of the cloth. The press is constructed so that pressure is applied very slowly which causes the coating to be spread evenly and gas pockets and dimples eliminated. Too rapid application of the curing pressure in some instances has damaged or broken the threads of the base fabric, whereas the slow application of pressure preserves the full strength of the threads.

Figure 16:
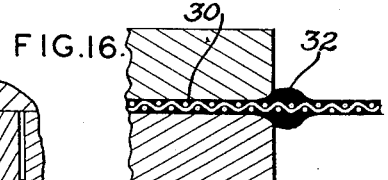
Fig. 16 is a corner sectional view of one of the presses with exuded plastic material.
Figure 15:
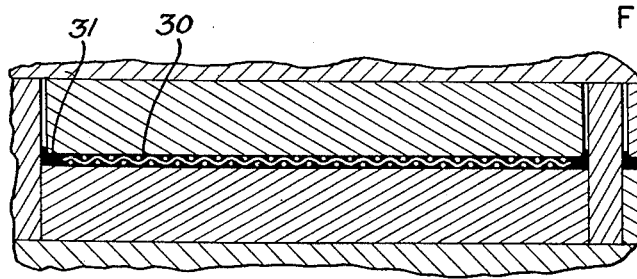
Fig. 15 is an enlargement of one of the pressing sections of Fig. 13.

Figs. 15 and 16 illustrate how the synthetic rubber is forced out sidewardly from the strips as at 31 and 32 causing transverse stretching of the fabric to compensate for the longitudinal stretching during calendering. Substantially no longitudinal stretching occurs during this curing operation because of the tighter condition of the longitudinal threads and the substantial length of the press, the excess coating tending to escape along the lesser and more elastic dimension while stretching the threads in that direction.

The crimp and tension of the weave, the quantity of synthetic rubber applied, the rate of applying the curing pressure, and the positioning of the press stops all affect the amount of stretching of the threads and these must be adjusted so that the finished product is of equal strength and resiliency in all directions. The specifications noted have been found practical, but some variations may be found to be permissible in practice. The condition of the cured sheet can be readily discovered by applying measured stretching forces and stretch and rupture measuring devices. Since most or all of the stretching during curing occurs in the short or transverse direction, the dimension can be varied by varying the rate of application of pressure or the viscosity of the synthetic rubber until the resultant product is at balanced tension.

Figure 3:
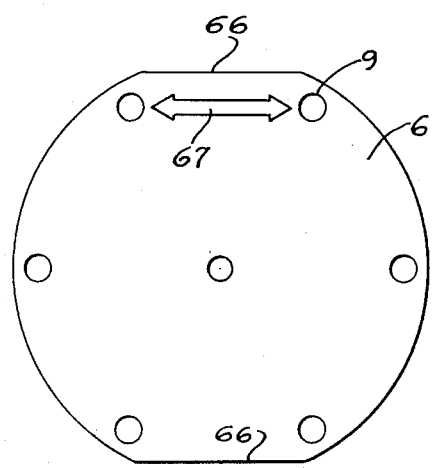
Fig. 3 is a plan view of a single diaphragm as shown in Figs. 1 and 2.

The coated and cured strips are then cut or stamped, as shown in Fig. 14, to form the diaphragm disks 33 and finally, the individual disks are perforated, as in Fig. 3, to provide for attachment to the body of the pump and the diaphragm operator.

For convenience in inspection and testing of diaphragms as well as to determine the proper position of the diaphragm in certain applications where a difference between the tension of the warp and weft is desired or permissible, I provide indicating means to show the direction of the weft. This indicating means may be nothing more than the flat sides indicated at 66. The reason for this is that there are some applications in which some excess flexibility is required in one direction, as, for instance, when the operation of the diaphragm by the members 3, 5, and 12 causes a tilting action. While there is normally very little difference between the stretching of the warp and weft in diaphragms constructed according to this process, it is possible to emphasize the difference to any desired extent by controlling the rate of application of pressure in the molds and by proper selection of crimp differential in the cloth. Ordinarily, I provide a printed mark which may be formed in raised letters integral with the rubber, such as indicated at 67, which also serves as an indication of the direction of the weft.

The cut-away portion 66 has the additional function of providing an open crevice between the flanges 7 and 8 into which the tips of screw drivers may be inserted as indicated in Figure 1. It will be understood that the flanges are held together by great forces during operation, and subjected to high temperatures. This causes the diaphragm to adhere to the metal surfaces of the flanges so that substantial force has to be applied to separate them. The provision of open crevices between the flanges as shown permits the exertion of the necessary force without injury to the diaphragm or the flanges.

The resulting product, accordingly, is a strong, durable, resistant diaphragm having uniform properties of flexibility, strength, and resiliency in all directions. Diaphragms according to the present invention, when tested to destruction, break along lines intersecting at right angles, indicating equal strength in both directions. Moreover, diaphragms as constructed in this manner have withstood life tests of 10,000 hours of operation at 1750 cycles per minute when mounted in the type of pump illustrated in Fig. 1. The Buna-N coating will withstand temperatures down to 70° Fahrenheit below zero without losing flexibility and is not materially affected by aromatic or other hydrocarbon fuels, alcohols, or water, whereas previous types of diaphragms have proven unserviceable under some or all of the above conditions.

In addition to the improvements in the making of the diaphragm, I have found that its life and durability may be substantially increased by the following improved method of mounting and operating it.

First, the diaphragm and its bolt holes 9, are made slightly larger than the corresponding holes of flanges 7 and 8 of the pump. During the assembly, the diaphragm is first set up in the subassembly shown in Fig. 2, and then the subassembly is placed in position between the flanges 7 and 8 with the rim of the diaphragm projecting outwardly slightly beyond the flanges and bolt holes 9 slightly out of registry with the corresponding holes in the flanges. The flanges are held lightly against the diaphragm, so as to prevent the formation of wrinkles, but not tightly enough to prevent some slippage. The central portion of the diaphragm is then displaced to the greatest extent permitted by the walls of the pump chamber, drawing the periphery of the diaphragm inwardly, compressing it, and bringing the holes into proper registry. The flanges 7 and 8 are then firmly bolted together, so as to clamp the diaphragm in a permanently radially compressed condition, it being noted that the walls of the pumping chamber permit a slightly greater distortion of the diaphragm than ever occurs in actual operation of the pump.

By this means, the operation of the diaphragm is such that it is normally in compression, and the application of tension is reduced or eliminated.

The invention may be modified as will occur to those skilled in the art and the exclusive use of all modifications as come within the scope of the appended claims is contemplated.

I claim:
1. The method of manufacturing diaphragms which consists in weaving a fabric with the warp and weft threads unequally crimped but equally spaced, pressing a coating of uncured rubber material to the surface of the fabric by rolling the fabric and coating material in the direction of the threads having the greater percentage of crimp, applying heat and stationary pressure to the surfaces of the fabric while the edges are unconfined so as to equalize the stretch of the transverse threads thereof with the stretch of the longitudinal threads, and maintaining the application of heat until the rubber is cured.

2. The method of manufacturing diaphragms which consists in applying a mass of plastic coating material to the surface of a sheet of porous substantially square fabric, passing said sheet and material longitudinally between pressure rolls, applying curing heat and pressure to strips of said fabric which are substantially longer in the direction of rolling without confining the edges to cure the plastic material, and forcing the coating material through the interstices of the fabric in columns integrally connecting the surface layers and firmly encasing the fabric cords.

3. The method of manufacturing diaphragms from a fabric with its warp and weft threads substantially equally spaced, but unequally tensioned or crimped which consists in applying a mass of uncured thermoplastic coating material to the surfaces of said fabric, feeding said fabric and material in one direction between pressure elements to superficially attach said material to the surfaces of said fabric while stretching the fabric in said direction, and applying heat and pressure in unified operations over narrow strips of said fabric which are longer in said direction to cure the plastic material and stretch said fabric transversely of said direction so as to compensate for stretching in said direction incident to said attaching operation.

4. The method of manufacturing material for fuel pump diaphragms which consists in applying a mass of uncured, synthetic rubber to the surface of a sheet of woven fabric, passing said sheet and synthetic rubber in one direction between pressure elements, and applying heat and pressure to a narrow strip of the coated sheet approximately the width of the diaphragm and over a length thereof equal to the diameter of a plurality of said diaphragms to cure said plastic material and stretch said fabric transversely of said direction so as to compensate for the longitudinal stretching incident to passing the sheet between said pressure elements.

5. The method of manufacturing sheet material for fuel pump diaphragms from cotton duck fabric with the warp and weft threads unequally crimped or tensioned and equally spaced from sixteen to twenty-five threads to the inch which consists in applying a mass of uncured, synthetic rubber coating to the surface of said fabric, passing said fabric and synthetic rubber in one direction between pressure rolls to embed said coating in the surfaces of said fabric, and applying sufficient stationary pressure and heat to a narrow strip of the material with its longer dimension extending in said direction to cure said coating and stretch the transverse threads of said fabric equally with the stretching of the longitudinal threads thereof incident to said embedding operation.

6. The method of manufacturing balanced tension diaphragms which consists in applying to a sheet of fabric a base coat of relatively thin material, applying a mass of thicker, more viscous synthetic rubber coating by rolling in one direction into the interstices of the fabric, cutting the coated fabric into strips with their longer dimensions extending parallel to said direction, and applying curing pressure to the coated strips normal to their surfaces for stretching the threads of the fabric transversely of said direction to compensate for the stretching incident to rolling, and cutting the cured sheet into diaphragms.

7. The method of manufacturing balanced tension material for diaphragms which consists in applying a thin base coat of sticky material to a sheet of fabric having its warp under substantially less tension than its weft and equally spaced, drying said coat of sticky material, applying a mass of thicker, more viscous synthetic rubber coating to the surface of the sheet, rolling said viscous coating in the direction of the warp into the surfaces of the fabric and thereby increasing the tension of the warp, cutting the coated fabric into narrow strips with their longer dimensions parallel to said warp, and applying heat and stationary curing pressure to said strips at such a rate and extent as to cause stretching of the threads in the direction of the weft to compensate for the stretching incident to the rolling operation.

8. The method of manufacturing balanced tension material for diaphragms which consists in applying a mass of viscous uncured synthetic rubber coating to the surface of a sheet of fabric, rolling said viscous coating in one direction into the interstices of the fabric, the quantity of coating material and the rolling pressure being adjusted so as to stretch the threads in said direction without reaching the elastic limit of said threads, and applying stationary curing pressure and heat normal to the surface of a narrow strip of the coated sheet substantially longer in said direction than in width to insure widthwise stretching of the threads an amount to compensate for the lengthwise stretching incident to the rolling operation.

9. The method of manufacturing resilient, balanced tension material for diaphragms which consists in applying a mass of viscous synthetic rubber in uncured condition to the surface of a sheet of fabric, rolling said coating into the interstices of the fabric, reducing the width of the fabric to a width slightly greater than the diameter of the diaphragm and substantially less than the length of the material, and applying stationary curing heat and pressure to the reduced sheet at a rate and extent to insure stretching of the threads transverse of the direction of rolling to compensate for the stretching incident to rolling.

10. The method of forming a diaphragm material which comprises applying a thin coating of Buna-N rubber dissolved in methyl-ethyl-ketone, partially drying said coating, applying a layer of uncured Buna-N rubber to each side of the cloth, and simultaneously stretching the cords of the fabric in one direction by rolling, and then curing and simultaneously stretching the cords of the fabric in the other direction by placing the material between heated plates which have substantially greater length in the direction of the cords which were first stretched, bringing the plates slowly together under great pressure.

11. The method of making coated fabric which comprises calendering an imperforate layer of coating material on each side of a porous fabric between rolls and simultaneously tensioning the cords of the fabric longitudinally in the direction of calendering, cutting the fabric in strips of substantially greater length than width in the direction of the tensioned cords, and curing the coating between heated pressure members each extending over a length of a coated strip at least several times greater than the width of the strip, the edges of the strip being unconfined to thereby cause the coating material to flow transversely of the strip and tension the cross cords, the pressure in curing being such as to project portions of the coating material from each layer through the interstices of the fabric to form rivet-like plugs integrally connecting the coating layers.

12. The method of forming a finished coated fabric with a mechanical bond between the fabric and coating which consists in the steps of spreading an adhesive on the outer surfaces of the fabric, applying a layer of uncured rubber of doughy consistency to each surface of the fabric by a calendering operation in a longitudinal direction thereof with a pressure sufficient to produce elongation of the material and increase the size of the interstices longitudinally of the fabric whereby the coating may penetrate the adhesive and the fabric interstices, cutting the coated material into narrow strips, and press curing the strips between platens each extending over the full width of a strip and over a length of the strip equal to at least several times the width thereof, the curing being effected with sufficient pressure to increase the size of the fabric interstices in a transverse direction to equalize the tension, to complete the penetration of the fabric by the coating, and to unite the material penetrating the fabric, whereby the opposite surface coatings are integrally connected and the fabric cords firmly encased.

13. The method of forming a coated fabric with a mechanical bond between the fabric and coating which consists in the steps of applying a layer of doughy rubber to each fabric surface of a sheet of fabric by calendering in a longitudinal direction thereof and thereby elongating the material and increasing the tensioning of the longitudinal cords, while reducing the width of the fabric and decreasing the tensioning of the transverse cords, cutting the coated material into narrow strips, and press curing the strips with unconfined edges between platens each extending over substantially the full width of a strip and over a length of the strip at least several times the width thereof, the curing pressure being sufficient to cause the coating material to flow transversely and thereby increase the width of the fabric and so as to equalize the tensioning of the cords in both directions, to complete the penetration of the fabric interstices by the coating material, and to unite the material penetrating the interstices whereby the opposite surface coatings are connected and the fabric cords resiliently encased.

IRVEN E. COFFEY.

REFERENCES CITED

The following references are of record in the file of this patent:

UNITED STATES PATENTS

| Number | Name | Date |
|---|---|---|
| 5,908 | Solis | Nov. 7, 1848 |
| 153,449 | Meyer | July 28, 1874 |
| 562,281 | Coyte | June 16, 1896 |
| 1,349,911 | Pratt | Aug. 17, 1920 |
| 1,872,846 | Thiele | Aug. 23, 1932 |
| 1,924,635 | Buffington | Aug. 29, 1933 |
| 2,004,110 | Head | June 11, 1935 |
| 2,098,038 | Hazell | Nov. 2, 1937 |
| 2,211,960 | Meigs | Aug. 20, 1940 |
| 2,268,543 | Coberly | Jan. 6, 1942 |
| 2,299,590 | Reynolds | Oct. 20, 1942 |
| 2,382,797 | Langan | Aug. 14, 1945 |
| 2,397,838 | Chavannes | Apr. 2, 1946 |
| 2,413,970 | Hawley | Jan. 7, 1947 |
| 2,414,806 | Finney | Jan. 28, 1947 |
| 2,423,294 | Colesworthy | July 1, 1947 |
| 2,429,177 | Young | Oct. 14, 1947 |

FOREIGN PATENTS

| Number | Country | Date |
|---|---|---|
| 65,743 | Norway | Feb. 1, 1943 |